(12) United States Patent
Park et al.

(10) Patent No.: US 9,233,686 B2
(45) Date of Patent: Jan. 12, 2016

(54) METHOD AND SYSTEM FOR SETTING LEARNING PERIOD OF ENGINE CLUTCH OF HYBRID VEHICLE

(71) Applicants: Hyundai Motor Company, Seoul (KR); Kia Motors Corporation, Seoul (KR)

(72) Inventors: Joonyoung Park, Seoul (KR); Chun Hyuk Lee, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 86 days.

(21) Appl. No.: 14/092,043

(22) Filed: Nov. 27, 2013

(65) Prior Publication Data

US 2014/0172212 A1 Jun. 19, 2014

(30) Foreign Application Priority Data

Dec. 18, 2012 (KR) .......................... 10-2012-0148809

(51) Int. Cl.
*B60L 9/00* (2006.01)
*B60W 20/00* (2006.01)
(Continued)

(52) U.S. Cl.
CPC ........ *B60W 20/40* (2013.01); *B60K 2006/4825* (2013.01); *B60W 10/00* (2013.01); *B60W 20/00* (2013.01); *B60W 2050/0087* (2013.01); *B60W 2050/0088* (2013.01); *B60W 2510/025* (2013.01); *B60W 2510/0291* (2013.01); *B60W 2530/14* (2013.01); *B60W 2530/145* (2013.01); *F16D 2500/5018* (2013.01); *Y02T 10/6252* (2013.01); *Y10S 903/902* (2013.01)

(58) Field of Classification Search
CPC ..... B60W 10/02; B60W 20/00; B60W 10/06; B60W 10/08; Y02T 10/6286
USPC .................. 701/22, 67, 68, 110; 477/167, 74; 180/65.275, 65.1; 903/902
See application file for complete search history.

(56) References Cited

U.S. PATENT DOCUMENTS

| 5,337,868 | A | * | 8/1994 | Liu | ....................... B60W 10/02 477/74 |
| 6,139,472 | A | * | 10/2000 | Harada | ................. F16H 61/143 477/169 |

(Continued)

FOREIGN PATENT DOCUMENTS

| JP | 2012-086722 A | 5/2012 |
| KR | 10-1000424 | 5/2010 |

*Primary Examiner* — Helal A Algahaim
*Assistant Examiner* — Shardul Patel
(74) *Attorney, Agent, or Firm* — Mintz Levin Cohn Ferris Glovsky and Popeo, P.C.; Peter F. Corless

(57) ABSTRACT

A method and system for setting a learning period of an engine clutch of a hybrid vehicle are provided. The engine clutch controls a connection of power between an engine and a motor of a hybrid vehicle, and the method includes: detecting and accumulating a launch slip time of the engine clutch; detecting and accumulating a launch slip entry number of times of the engine clutch; detecting and accumulating a time in which a temperature of the engine clutch exceeds a setting temperature; detecting and accumulating a number of times in which the temperature of the engine clutch exceeds the setting temperature; and setting a learning period of the engine clutch based on at least one of the launch slip accumulation time, the launch slip entry accumulation number of times, the setting temperature exceeding accumulation time, and the setting temperature exceeding accumulation number of times.

14 Claims, 6 Drawing Sheets

(51) Int. Cl.
*B60W 10/00* (2006.01)
*B60K 6/48* (2007.10)
*B60W 50/00* (2006.01)

(56) References Cited

U.S. PATENT DOCUMENTS

| | | | |
|---|---|---|---|
| 7,938,209 B2 * | 5/2011 | Dilzer | B60K 6/48 180/65.28 |
| 2007/0102205 A1 * | 5/2007 | Yamanaka | B60W 30/186 180/65.1 |
| 2009/0234524 A1 * | 9/2009 | Kim | B60K 6/48 701/22 |
| 2010/0114443 A1 * | 5/2010 | Terwart | F16D 48/066 701/68 |
| 2011/0153134 A1 | 6/2011 | Rocq et al. | |
| 2012/0232767 A1 * | 9/2012 | MacMillian | F16D 48/06 701/67 |
| 2013/0297115 A1 * | 11/2013 | Doering | B60K 6/48 701/22 |
| 2014/0336904 A1 * | 11/2014 | Nakanishi | F02D 17/04 701/110 |

* cited by examiner

METHOD AND SYSTEM FOR SETTING LEARNING PERIOD OF ENGINE CLUTCH OF HYBRID VEHICLE

CROSS-REFERENCE TO RELATED APPLICATION

This application claims under 35 U.S.C. §119(a) priority to and the benefit of Korean Patent Application No. 10-2012-0148809 filed in the Korean Intellectual Property Office on Dec. 18, 2012, the entire contents of which are incorporated herein by reference.

BACKGROUND (a) Field of the Invention

The present invention relates to a method and system for setting a learning period of an engine clutch of a hybrid vehicle.

(b) Description of the Related Art

In general, a hybrid vehicle reduces an exhaust gas and enhances fuel consumption using a motor as well as an engine as power sources. In a hybrid vehicle, an engine 11, a motor 12, and a transmission 13 are disposed in a line, as shown in FIG. 1 (RELATED ART).

In the hybrid vehicle 10, an engine clutch 14 for transferring and intercepting driving power between the engine 11 and the motor 12 is mounted. A conceptual diagram of the engine clutch 14 is shown in FIG. 2.

As shown in FIG. 2 (RELATED ART), the engine clutch 14 includes a friction member (FE) that moves by pressure (hydraulic pressure) of a fluid (oil) (FL) in an amount controlled by operation of a solenoid valve (SOL) and a return spring (SP) that returns the friction member PE when an operation hydraulic pressure is not applied to the friction member PE. The solenoid valve SOL is generally controlled by a current.

In the solenoid valve SOL a pressure (hydraulic, pressure) that is actually applied to the engine clutch 14 is measured by a hydraulic pressure sensor. The SOL operates to increase a hydraulic pressure that is applied to the PE, as an applied current increases. When the hydraulic pressure that is applied to the PE increases, a contact frictional force of the PE increases. Therefore, a torque that is transferred to the engine clutch 14 increases proportionally to a current that is applied to the SOL.

In the hybrid vehicle 10, an integrated starter & generator (ISG) 15 that starts the engine 11, or that functions as a generator is mounted in the engine 11. The ISG 15 is referred to as a hybrid starter & generator (HSG).

The hybrid vehicle 10 can travel in an electric vehicle (EV) mode, which is a pure electric vehicle mode that uses only power of the motor 12. The hybrid vehicle 10 can travel in a hybrid electric vehicle (HEV) mode that uses a torque of the motor 12 as auxiliary power while using a torque of the engine 11 as main power.

Further, when the hybrid vehicle 10 travels by braking or inertia of the vehicle, the hybrid vehicle 10 travels in a regenerative braking (RB) mode that recovers braking and inertia energy of the vehicle through generation in the motor and that charges the battery with the energy. In this way, for conversion of a mode, in order to transfer and separate power between the motor 12 and the engine 11, the hybrid vehicle 10 operates the engine clutch 14.

Because an operating hydraulic, pressure of the engine clutch for determining operation of the engine clutch 14 can greatly change drivability, power performance, and fuel consumption of the hybrid vehicle 10, the operation hydraulic pressure of the engine clutch 14 should be accurately controlled.

However, a variation occurs in operation of the engine clutch 14 by a characteristic and a use environment of the engine clutch 14, as shown in FIG. 3 (RELATED ART). According to the variation, an offset variation that is related to a torque transfer start hydraulic pressure, and a gain variation and a linear variation that are related to a transfer torque may exist. Each variation may occur by a characteristic of the engine clutch 14 and a characteristic of the solenoid valve SOL. Each variation may occur due to a difference between engine clutch single products, for example, part assembly tolerance, a current to pressure characteristic variation, and a characteristic change according to aging lapse of the SOL. When each variation is not appropriately corrected through learning, each variation can have a negative influence on drivability, power performance, and fuel consumption of the hybrid vehicle.

Learning of the engine clutch of the hybrid vehicle for correcting each variation includes end of line (EOL) learning and traveling learning. A variation of the engine clutch single product may he mostly compensated by the EOL learning. The traveling learning is applied to compensate a characteristic in which the engine clutch slowly changes by lapse of aging according to vehicle driving.

A characteristic of the engine clutch changes according to the use frequency of the engine clutch, and at a low speed, as a launch slip control increases, the characteristic may quickly change. The launch slip entry frequency varies according to a driver or a driving condition of the hybrid vehicle.

Launch slip of the engine clutch refers to slip that occurs while applying a hydraulic pressure to the engine clutch before a speed of both ends of the engine clutch is synchronized. In particular, a launch slip of the engine clutch is a so-called half clutch state, and when engine power may be transferred to a driving shaft of the hybrid vehicle, and in the launch slip, the hybrid vehicle may start.

Traveling learning of the engine clutch includes kiss point learning and transfer torque learning and is generally performed in the fixed driving cycle (DC) number of times or a predetermined mileage cycle.

In the DC, a cycle from Ignition ON to Ignition OFF is defined as one time DC. However, in a characteristic of the engine clutch, because a changing time is different according to an applied hybrid vehicle, when the traveling learning period is determined to the fixed done DC number of times or a predetermined mileage cycle, accurate learning cannot be performed. In particular, when the traveling learning period is determined to the fixed DC number of times or a predetermined mileage cycle, a phenomenon that a traveling learning period is so frequent or no short according to a situation may occur.

The above information disclosed in this Background section is only for enhancement of understanding of the background of the invention and therefore it may contain information that does not form the prior art that is already known in this country to ape/son of ordinary skill in the art.

SUMMARY

The present invention provides a method and system for setting a learning period of an engine clutch of a hybrid vehicle capable of varying a traveling learning period based on a launch slip entry number of times, a launch slip accumulation time, a setting temperature exceeding time of an engine clutch temperature, and a setting temperature exceeding entry number of times of the engine clutch of the hybrid vehicle.

An exemplary embodiment of the present invention provides a method of setting a learning period of an engine clutch that controls connection of power between an engine and a motor of a hybrid vehicle, the method including: detecting and accumulating a launch slip time of the engine clutch; detecting and accumulating a launch slip entry number of times of the engine clutch; detecting and accumulating a time in which a temperature of the engine clutch exceeds a setting temperature; detecting and accumulating a number of times in which the temperature of the engine clutch exceeds the setting temperature; and setting a learning period of the engine clutch based on at least of the launch slip accumulation time, the launch slip entry accumulation number of times, the setting temperature exceeding accumulation time, and the setting temperature exceeding accumulation number of times.

The setting of a learning period of the engine clutch may include reducing a mileage learning period value that is set by a mileage value of the hybrid vehicle to correspond to the launch slip accumulation time or the launch slip entry accumulation number of times; and setting the mileage learning period value that is reduced by the launch slip accumulation time or the launch slip entry accumulation number of times as a new learning period of the engine clutch.

The setting of a learning period of the engine clutch may further include reducing a driving cycle (DC) learning period value that is set by the DC number of times of the hybrid vehicle to correspond to the launch slip entry accumulation number of times or the launch slip entry accumulation number of times; and setting a DC learning period value that is reduced by the launch slip entry accumulation number of times or the launch slip entry accumulation number of times as a new learning period of the engine clutch.

The setting of a learning period of the engine clutch may further include reducing a mileage learning period value that is set by a mileage value of the hybrid vehicle to correspond to the setting temperature exceeding accumulation time or the setting temperature exceeding accumulation number of times; and setting the mileage learning period value that is reduced by the setting temperature exceeding accumulation time or the setting temperature exceeding accumulation number of times as a new learning period of the engine clutch.

The setting of a learning period of the engine clutch may further include reducing a DC learning period value that is set by the DC number of times value of the hybrid vehicle to correspond to the setting temperature exceeding accumulation number of times or the setting temperature exceeding accumulation time; and setting the DC learning period value that is reduced by the setting temperature exceeding accumulation number of times or the setting temperature exceeding accumulation time as a new learning period of the engine clutch.

A temperature of the engine clutch may be detected by a previously measured and determined temperature model of the engine clutch.

According to the present invention, a system for setting a learning period of an engine clutch that controls connection of power between an engine and a motor of a hybrid vehicle preferably includes: an engine clutch learning period setting device including a launch slip time accumulation unit that detects and accumulates a launch slip time of the engine clutch; a launch slip entry number accumulation unit that detects and accumulates launch slip entry number of times of the engine clutch; a setting temperature exceeding time accumulation unit that detects and accumulates a time in which a temperature of the engine clutch exceeds a setting temperature; and a setting temperature exceeding number accumulation unit that detects and accumulates a number of times in which the temperature of the engine clutch exceeds the setting temperature, wherein the engine clutch learning period setting device operates by a program that is set to perform the method of setting a learning period of an engine clutch of a hybrid vehicle according to an exemplary embodiment of the present invention.

The engine clutch learning period setting device may include a mileage subtraction unit that subtracts a mileage learning period value that is set by a mileage value of the hybrid vehicle to correspond to the launch slip accumulation time or the launch slip entry accumulation number of times; a learning period setting unit that sets the mileage learning period value that is reduced by the launch slip accumulation time or the launch slip entry accumulation number of times as a new learning period of the engine clutch; a DC subtraction unit that subtracts a DC learning period value that is set by the DC number of times of the hybrid vehicle to correspond to the launch slip entry accumulation number of times or the launch slip accumulation time; and a learning period setting unit that sets the DC learning period value that is reduced by the launch slip entry accumulation number of times or the launch slip accumulation time as a new learning period of the engine clutch, The engine clutch learning period setting device may include a mileage subtraction unit that subtracts a mileage learning period value that is set by a mileage value of the hybrid vehicle to correspond to the setting temperature exceeding accumulation time or the setting temperature exceeding accumulation number of times; a learning period setting unit that sets the mileage learning period value that is reduced by the setting temperature exceeding accumulation time or the setting temperature exceeding accumulation number of times as a new learning period of the engine clutch; a mileage subtraction unit that subtracts a DC learning period value that is set by a DC number of times value of the hybrid vehicle to correspond to the setting temperature exceeding accumulation number of times or the setting temperature exceeding accumulation time; and a learning period setting unit that sets the DC learning period value that is reduced by the setting temperature exceeding accumulation number of times or the setting temperature exceeding accumulation time as a new learning period of the engine clutch.

The system may further include a learning period selection unit that selects a new learning period that is set in the each learning period setting unit to set the selected new learning period to a final new learning period.

As described above, according to an exemplary embodiment of the present invention, in considering of the launch slip entry number of times and a launch slip accumulation time of an engine clutch of a hybrid vehicle, a setting temperature exceeding time of an engine clutch temperature, and the setting temperature exceeding entry number of times, a learning period of the engine clutch can be variably set.

According to an exemplary embodiment of the present invention, because a learning period is set based on an actual use amount of an engine clutch, unnecessary learning entry can be prevented, and due to an insufficient learning period, a vehicle aging effect is not reflected to the control of the engine clutch and thus a phenomenon that drivability is aggravated can be prevented.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the below methods are executed by at least one controller. The term controller refers to a hardware device that includes a memory and a processor. The memory is configured to stored modules, the processor is specifically configured to execute the modules to perform one or more processes which are described further below.

Further, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards, and optical storage devices.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
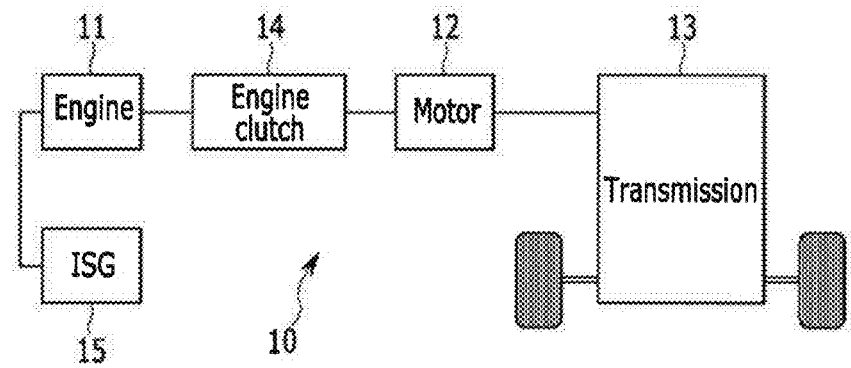
FIG. 1 (RELATED ART) is a schematic diagram illustrating a configuration of a conventional hybrid vehicle.
Figure 2:
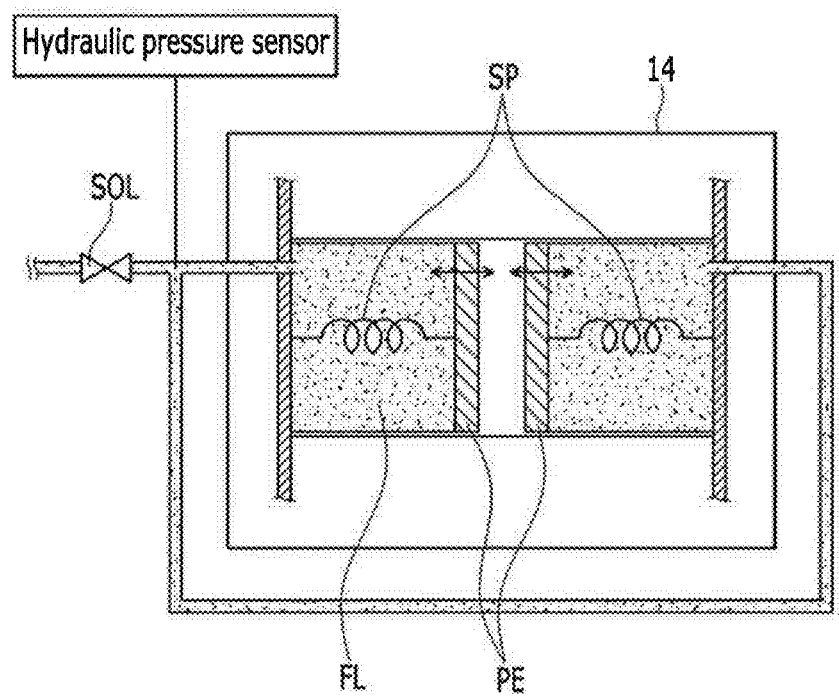
FIG. 2 (RELATED ART) is a schematic diagram illustrating a configuration of a conventional engine clutch.
Figure 3:
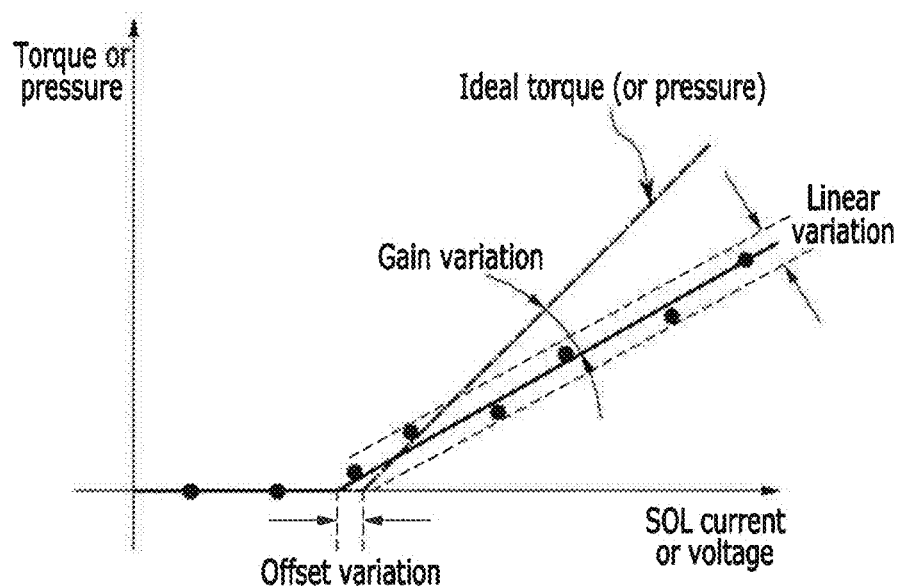
FIG. 3 (RELATED ART) is a graph illustrating an operation variation of a conventional engine clutch.
Figure 4:
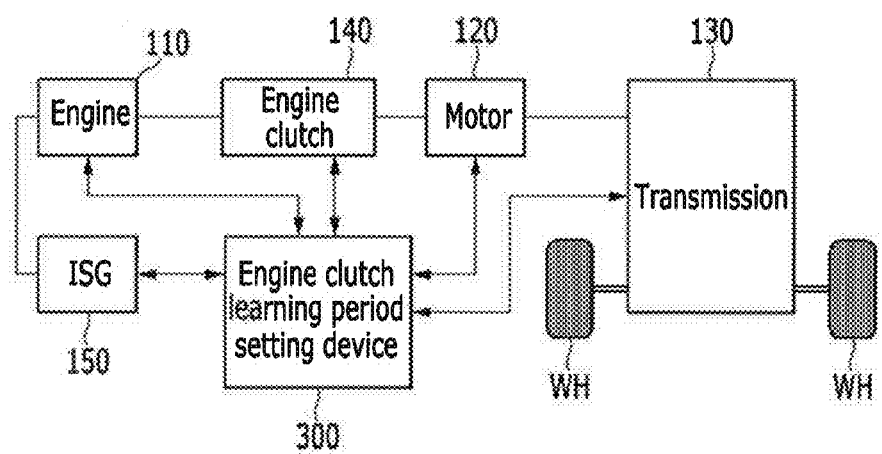
FIG. 4 is a schematic diagram of a learning period setting system of an engine clutch of a hybrid vehicle according to an exemplary embodiment of the present invention.

FIG. 4 is a schematic diagram of a learning period setting system of an engine clutch according to an exemplary embodiment of the present invention.

The learning period setting system of the engine clutch according to an exemplary embodiment of the present invention is a system that variably sets a learning period of an engine clutch 140 for coupling or releasing an engine 110 and a motor 120 for traveling in an EV mode or a HEV mode of a hybrid vehicle.

The learning period setting system of the engine clutch according to an exemplary embodiment of the present invention may be installed in a hybrid vehicle including the engine 110 and the motor 120 of the hybrid vehicle; a transmission 130 that shifts a driving torque of the engine 110 and the motor 120 to transfer or intercept the driving torque to a wheel (WH); the engine clutch 140 that is positioned between the engine 110 and the motor 120 to couple or release the engine 110 and the motor 120; and an integrated starter & generator (ISG) 150 that starts or generates the engine 110.

The learning period setting system of the engine clutch according to an exemplary embodiment of the present invention includes an engine clutch learning period setting device 300, as shown in FIG. 4.

The engine clutch learning period setting device 300 includes at least one microprocessor operated by a predetermined program or hardware including the microprocessor, and the predetermined program may be formed with a series of commands for performing a method of setting a learning period of the engine clutch according to an exemplary embodiment of the present invention as described herein.

According to an exemplary embodiment of the present invention, the engine clutch learning period setting device 300 may be formed, for example, as a hybrid control unit (HCU) that controls entire operations of a hybrid vehicle, or that is included in the HCU, but it should be understood that the present invention is not limited thereto. Regardless of the particular configuration of the engine clutch learning period setting device 300, it is preferable that the engine clutch learning period setting device 300 be arranged to substantially variably set a learning period of the engine clutch of the hybrid vehicle, according to the present invention.

Figure 5:
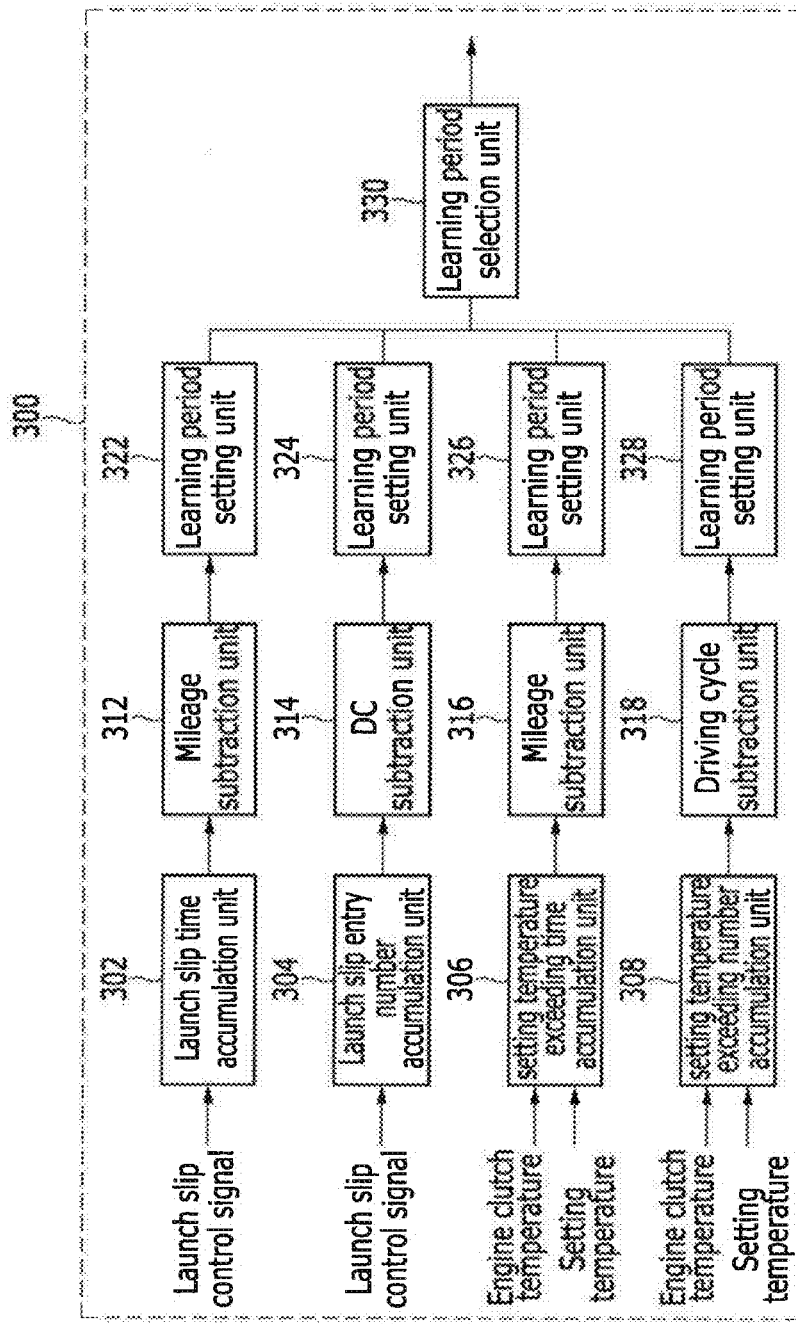
FIG. 5 is a block diagram illustrating a configuration of a learning period setting device used in the learning period setting system of FIG. 4.

The engine clutch learning period setting device 300 may be set, as shown in FIG. 5, utilizing one or more variables. Referring to FIG. 5, the engine clutch learning period setting device 300 includes a launch slip time accumulation unit 302 that detects and accumulates a launch slip time of the engine clutch 140; a launch slip entry number accumulation unit 304 that detects and accumulates the launch slip entry number of times of the engine clutch 140; a setting temperature exceeding time accumulation unit 306 that detects and accumulates a time in which a temperature of the engine clutch 140 exceeds a setting temperature; and a setting temperature exceeding number accumulation unit 308 that detects and accumulates the number of times in which a temperature of the engine clutch 140 exceeds a setting temperature. The respective accumulation units 302, 304, 306, and 308 may include a counter that can count a time and the number of times.

The engine clutch learning period setting device 300 includes a mileage subtraction unit 312 that subtracts a mileage learning period value that is set by a mileage value of the hybrid vehicle to correspond to the launch slip accumulation time or the launch slip entry accumulation number of times; and a learning period setting unit 322 that sets, if the mileage learning period value that is reduced by the launch slip accumulation time or the launch slip entry accumulation number of times, for example, is equal to or less than a predetermined value, a new learning period of the engine clutch based on a time until the mileage learning period value becomes the predetermined value or less.

The engine clutch learning period setting device 300 includes a DC subtraction unit 314 that subtracts a DC learning period value that is set by a DC number of times value of the hybrid vehicle to correspond to the launch slip entry accumulation number of times or the launch slip accumulation time; and a learning period setting unit 324 that sets, if the DC learning period value that is reduced by the launch slip entry accumulation number of times or the launch slip accumulation time, for example, is equal to or less than a predetermined value, a new learning period of the engine clutch based on a time until the DC learning period value becomes the predetermined value or less.

The engine clutch learning period setting device 300 includes a mileage subtraction unit 316 that subtracts a mileage learning period value that is set by a mileage value of the hybrid vehicle to correspond to the setting temperature exceeding accumulation time or the setting temperature exceeding accumulation number of times; and a learning period setting unit 326 that sets, if the mileage learning period value that is reduced by the setting temperature exceeding accumulation time or the setting temperature exceeding accumulation number of times, for example, is equal to or less than a predetermined value, a new learning period of the engine clutch based on a time until the mileage learning period value becomes the predetermined value or less.

The engine clutch learning period setting device 300 includes a driving cycle subtraction unit 318 that subtracts a DC learning Period value that is set by a DC number of times value of the hybrid vehicle to correspond to the setting temperature exceeding accumulation number of times or the setting temperature exceeding accumulation time; and a learning period setting unit 328 that sets, if the DC learning period value that is reduced by the setting temperature exceeding accumulation number of times or the setting temperature exceeding accumulation time, for example, is equal to or less than a predetermined value, a new learning period of the engine clutch based on a time until the DC learning period value becomes the predetermined value or less.

The engine clutch learning period setting device 300 includes a learning period selection unit 330 that selects a new learning period that is set in the respective learning period setting units 322, 324, 326, and 328 to set the selected new learning period to a final new learning period.

In the meantime, the launch slip time accumulation unit 302 is connected to the mileage subtraction unit 312; the launch slip entry number accumulation unit 304 is connected to the DC subtraction unit 314; the setting temperature exceeding time accumulation unit 306 is connected to the mileage subtraction unit 316; and the setting temperature exceeding number accumulation unit 308 is connected to the driving cycle subtraction unit 318 in FIG. 5, but it should be understood that the scope of the present invention is not essentially limited thereto.

In other words, according to another embodiment of present invention, the launch slip time accumulation unit 302 may also be connected to the DC subtraction unit 314; the launch slip entry number accumulation unit 304 may also be connected to the mileage subtraction unit 312; the setting temperature exceeding time accumulation unit 306 may also be connected to the driving cycle subtraction unit 318; and the setting temperature exceeding number accumulation unit 308 may also be connected to the mileage subtraction unit 316, which are well known to a person of ordinary skill in the art.

Hereinafter, a method of setting a learning period of an engine clutch of a hybrid vehicle according to an exemplary embodiment of the present invention will be described in detail with reference to the attached drawing.

Figure 6:
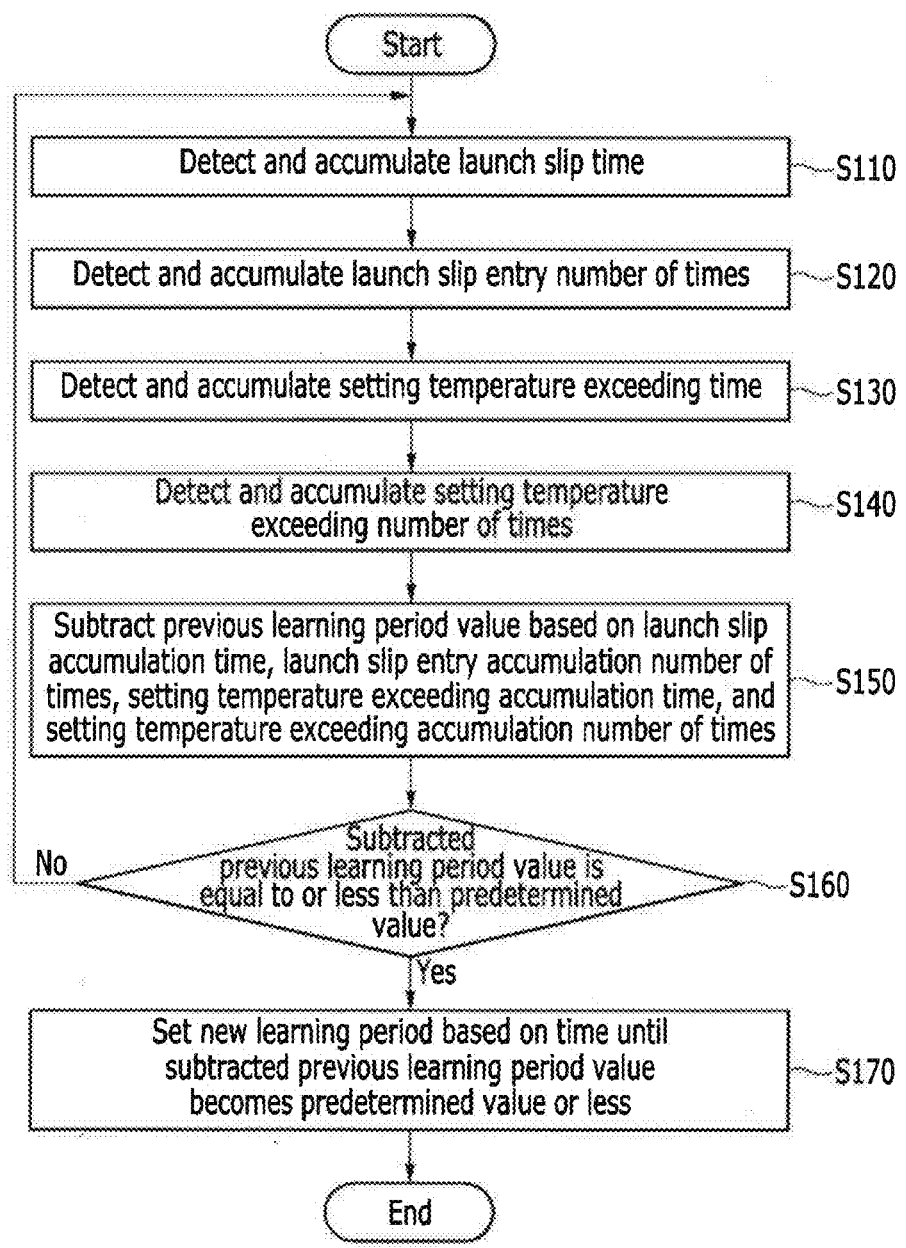
FIG. 6 is a flowchart illustrating a method of setting a learning period of an engine clutch of a hybrid vehicle according to an exemplary embodiment of the present invention.

FIG. 6 is a flowchart illustrating a method of setting a learning period of an engine clutch of a hybrid vehicle according to an exemplary embodiment of the present invention. As shown in FIG. 6, the launch slip time accumulation unit 302 of the engine clutch learning period setting device 300 detects and accumulates a launch slip time of the engine clutch (S110). In a HCU of a hybrid vehicle, a launch slip control bit and a reset signal corresponding to a launch slip are output and thus the launch slip time is detected and accumulated through the signals, Thereafter, the launch slip entry number accumulation unit 304 of the engine clutch learning period setting device 300 detects and accumulates the launch slip entry number of times of the engine clutch 140 (S120). In the HCU of the hybrid vehicle, the launch slip control bit and the reset signal corresponding to launch slip entry are output and thus the launch slip entry number of times are detected and accumulated through the signals.

Thereafter, the setting temperature exceeding time accumulation unit 306 of the engine clutch learning period setting device 300 detects and accumulates a time in which a temperature of the engine clutch 140 exceeds a setting temperature (S130). A temperature of the engine clutch 140 is detected by a previously measured and determined temperature model of the engine clutch through an experiment of the engine clutch 140. The setting temperature exceeding time accumulation unit 306 stores a temperature model of the engine clutch 140. A temperature of the engine clutch 140 may be detected through a temperature sensor.

Thereafter, the setting temperature exceeding number accumulation unit 308 of the engine clutch learning period setting device 300 detects and accumulates the number of times in which the temperature of the engine clutch 140 exceeds the setting temperature (S140).

Thereby, when the respective accumulation units 302, 304, 306, and 308 of the engine clutch learning period setting device 300 acquire the launch slip accumulation time, the launch slip entry accumulation number of times, the setting temperature exceeding accumulation time, and the setting temperature exceeding accumulation number of times, the engine clutch learning period setting device 300 subtracts a previous learning period value based on the acquired accumulated data (S150). If the subtracted previous learning period value, for example, is equal to or less than a predetermined value, the engine clutch learning period setting device 300 sets a new learning period based on an accumulation time until the subtracted previous learning period value becomes the predetermined value or less (S160 and S170).

The foregoing description will be described in detail hereinafter. When the launch slip time or the launch slip entry number of times is accumulated at step S110, the mileage subtraction unit 312 of the engine clutch learning period setting device 300 may reduce a mileage learning period value that is set by a mileage value of the hybrid vehicle to correspond to the launch slip accumulation time or the launch slip entry accumulation number of times.

If the mileage learning period value that is reduced by the launch slip accumulation time or the launch slip entry accumulation number of times, for example, is equal to or less than a predetermined value, the learning period setting unit 322 of the engine clutch learning period setting device 300 may set a new learning period of the engine clutch based on a time until the mileage learning period value becomes the predetermined value or less.

When the launch slip entry number of times or the launch slip times are accumulated at step S120, the DC subtraction unit 314 of the engine clutch learning period setting device 300 may reduce a DC learning period value that is set by a DC number of times value of the hybrid vehicle to correspond to the launch slip entry accumulation number of times or the launch slip accumulation time.

If the DC learning period value that is reduced by the launch slip entry accumulation number of times or the launch slip accumulation time, for example, is equal to or less than a predetermined value, the learning period setting unit 324 of the engine clutch learning period setting device 300 may set a new learning period of the engine clutch based on a time until the DC learning period value becomes the predetermined value or less.

When the setting temperature exceeding time or the setting temperature exceeding number of times are accumulated at step S130, the mileage subtraction unit 316 of the engine clutch learning period setting device 300 may reduce a mileage learning period value that is set by a mileage value of the hybrid vehicle to correspond to the setting temperature exceeding accumulation time or the setting temperature exceeding accumulation number of times.

If the mileage learning period value that is reduced by the setting temperature exceeding accumulation time or the setting temperature exceeding accumulation number of times, for example, is equal to or less than a predetermined value, the learning period setting unit 326 of the engine clutch learning period setting device 300 may set a new learning period of the engine clutch based on a time until the mileage learning period value becomes the predetermined value or less.

When the setting temperature exceeding entry number of times or the setting temperature exceeding time is accumulated at step S140, the driving cycle subtraction unit 318 of the engine clutch learning period setting device 300 may reduce a DC learning period value that is set by a DC number of times value of the hybrid vehicle to correspond to the setting temperature exceeding accumulation number of times or the setting temperature exceeding accumulation time.

If the DC learning period value that is reduced by the setting temperature exceeding accumulation number of times or the setting temperature exceeding accumulation time, for example, is equal to or less than a predetermined value, the learning period setting unit 328 of the engine clutch learning period setting device 300 may set a new learning period of the engine clutch based on a time until the DC learning period value becomes the predetermined value or less.

Thereby, according to an exemplary embodiment of the present invention, in consideration of the launch slip entry number of times, the launch slip accumulation time, the setting temperature exceeding time of an engine clutch temperature, and the setting temperature exceeding entry number of times of the engine clutch of the hybrid vehicle, a learning period of the engine clutch can be variably set.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of setting a learning period of an engine clutch that controls connection of power between an engine and a motor of a hybrid vehicle, the method comprising the steps of:
   detecting and accumulating a launch slip time of the engine clutch;
   detecting and accumulating a launch slip entry number of times of the engine clutch;
   detecting and accumulating a time in which a temperature of the engine clutch exceeds a setting temperature;
   detecting and accumulating a number of times in which the temperature of the engine clutch exceeds the setting temperature; and
   setting a learning period of the engine clutch based on at least one of: the launch slip accumulation time, the launch slip entry accumulation number of times, the setting temperature exceeding accumulation time, and the setting temperature exceeding accumulation number of times,
   wherein the setting of the learning period of the engine clutch further comprises the steps of:
      setting a new learning period of the engine clutch by using a mileage learning period value that is set by a mileage value of the hybrid vehicle or a driving cycle (DC) learning period value that is set by a DC number of times of the hybrid vehicle.

2. The method of claim 1, wherein the setting of the learning period of the engine clutch further comprises the steps of:
   reducing the mileage learning period value that is set by the mileage value of the hybrid vehicle to correspond to the launch slip accumulation time or the launch slip entry accumulation number of times; and
   setting the mileage learning period value that is reduced by the launch slip accumulation time or the launch slip entry accumulation number of times as the new learning period of the engine clutch.

3. The method of claim 1, wherein the setting of the learning period of the engine clutch further comprises the steps of:
   reducing the driving cycle (DC) learning period value that is set by the DC number of times of the hybrid vehicle to correspond to the launch slip entry accumulation number of times or the launch slip accumulation time; and
   setting a DC learning period value that is reduced by the launch slip entry accumulation number of times or the launch slip accumulation time as the new learning period of the engine clutch.

4. The method of claim 1, wherein the setting of the learning period of the engine clutch further comprises the steps of:
   reducing the mileage learning period value that is set by the mileage value of the hybrid vehicle to correspond to the setting temperature exceeding accumulation time or the setting temperature exceeding accumulation number of times; and
   setting the mileage learning period value that is reduced by the setting temperature exceeding accumulation time or the setting temperature exceeding accumulation number of times as the new learning period of the engine clutch.

5. The method of claim 1, wherein the setting of the learning period of the engine clutch further comprises the steps of:
   reducing the DC learning period value that is set by the DC number of times value of the hybrid vehicle to correspond to the setting temperature exceeding accumulation number of times or the setting temperature exceeding accumulation time; and
   setting the DC learning period value that is reduced by the setting temperature exceeding accumulation number of times or the setting temperature exceeding accumulation time as the new learning period of the engine clutch.

6. The method of claim 1, wherein the temperature of the engine clutch is detected by a previously measured and determined temperature model of the engine clutch.

7. A system of setting a learning period of an engine clutch that controls connection of power between an engine and a motor of a hybrid vehicle, the system comprising:
an engine clutch learning period setting device comprising:
a launch slip time accumulation unit that detects and accumulates a launch slip time of the engine clutch;
a launch slip entry number accumulation unit that detects and accumulates a launch slip entry number of times of the engine clutch;
a setting temperature exceeding time accumulation unit that detects and accumulates a time in which a temperature of the engine clutch exceeds a setting temperature; and
a setting temperature exceeding number accumulation unit that detects and accumulates a number of times in which the temperature of the engine clutch exceeds the setting temperature,
wherein the engine clutch learning period setting device is operated by a predetermined program, the predetermined program includes a series of commands for executing a method of setting the learning period of the engine clutch comprising the steps of:
detecting and accumulating the launch slip time of the engine clutch;
detecting and accumulating the launch slip entry number of times of the engine clutch;
detecting and accumulating the time in which the temperature of the engine clutch exceeds the setting temperature;
detecting and accumulating the number of times in which the temperature of the engine clutch exceeds the setting temperature; and
setting the learning period of the engine clutch based on at least one of the launch slip accumulation time, the launch slip entry accumulation number of times, the setting temperature exceeding accumulation time, and the setting temperature exceeding accumulation number of times,
wherein the setting of the learning period of the engine clutch further comprises the steps of:
setting a new learning period of the engine clutch by using a mileage learning period value that is set by a mileage value of the hybrid vehicle or a driving cycle (DC) learning period value that is set by a DC number of times of the hybrid vehicle.

8. The system of claim 7, wherein the engine clutch learning period setting device further comprises:
a mileage subtraction unit that subtracts the mileage learning period value that is set by the mileage value of the hybrid vehicle to correspond to the launch slip accumulation time or the launch slip entry accumulation number of times;
a learning period setting unit that sets the mileage learning period value that is reduced by the launch slip accumulation time or the launch slip entry accumulation number of times as the new learning period of the engine clutch;
a DC subtraction unit that subtracts the DC learning period value that is set by the DC number of times of the hybrid vehicle to correspond to the launch slip entry accumulation number of times or the launch slip accumulation time; and
a learning period setting unit that sets the DC learning period value that is reduced by the launch slip entry accumulation number of times or the launch slip accumulation time as the new learning period of the engine clutch.

9. The system of claim 8, wherein the engine clutch learning period setting device further comprises:
a mileage subtraction unit that subtracts a mileage learning period value that is set by the mileage value of the hybrid vehicle to correspond to the setting temperature exceeding accumulation time or the setting temperature exceeding accumulation number of times;
a learning period setting unit that sets the mileage learning period value that is reduced by the setting temperature exceeding accumulation time or the setting temperature exceeding accumulation number of times as the new learning period of the engine clutch;
a mileage subtraction unit that subtracts the DC learning period value that is set by the DC number of times value of the hybrid vehicle to correspond to the setting temperature exceeding accumulation number of times or the setting temperature exceeding accumulation time; and
a learning period setting unit that sets the DC learning period value that is reduced by the setting temperature exceeding accumulation number of times or the setting temperature exceeding accumulation time as the new learning period of the engine clutch.

10. The system of claim 9, further comprising a learning period selection unit that selects the new learning period that is set in the each learning period setting unit to set the selected new learning period to a final new learning period.

11. A system of setting a learning period of an engine clutch that controls connection of power between an engine and a motor of a hybrid vehicle, the system comprising:
an engine clutch learning period setting device comprising:
a launch slip time accumulation unit that detects and accumulates a launch slip time of the engine clutch;
a launch slip entry number accumulation unit that detects and accumulates a launch slip entry number of times of the engine clutch;
a setting temperature exceeding time accumulation unit that detects and accumulates a time in which a temperature of the engine clutch exceeds a setting temperature; and
a setting temperature exceeding number accumulation unit that detects and accumulates a number of times in which the temperature of the engine clutch exceeds the setting temperature,
wherein the engine clutch learning period setting device sets a learning period of the engine clutch based on at least one of: the launch slip accumulation time, the launch slip entry accumulation number of times, the setting temperature exceeding accumulation time, and the setting temperature exceeding accumulation number of times, and
wherein the setting of the learning period of the engine clutch further comprises the steps of:
setting a new learning period of the engine clutch by using a mileage learning period value that is set by a mileage value of the hybrid vehicle or a driving cycle (DC) learning period value that is set by a DC number of times of the hybrid vehicle.

12. The system of claim 11, wherein the engine clutch learning period setting device further comprises:
a mileage subtraction unit that subtracts the mileage learning period value that is set by the mileage value of the hybrid vehicle to correspond to the launch slip accumulation time or the launch slip entry accumulation number of times;

a learning period setting unit that sets the mileage learning period value that is reduced by the launch slip accumulation time or the launch slip entry accumulation number of times as the new learning period of the engine clutch;

a DC subtraction unit that subtracts the DC learning period value that is set by the DC number of times of the hybrid vehicle to correspond to the launch slip entry accumulation number of times or the launch slip accumulation time; and a learning period setting unit that sets the DC learning period value that is reduced by the launch slip entry accumulation number of times or the launch slip accumulation time as the new learning period of the engine clutch.

13. The system of claim 11, wherein the engine clutch learning period setting device further comprises:

a mileage subtraction unit that subtracts the mileage learning period value that is set by the mileage value of the hybrid vehicle to correspond to the setting temperature exceeding accumulation time or the setting temperature exceeding accumulation number of times;

a learning period setting unit that sets the mileage learning period value that is reduced by the setting temperature exceeding accumulation time or the setting temperature exceeding accumulation number of times as the new learning period of the engine clutch;

a mileage subtraction unit that subtracts the DC learning period value that is set by the DC number of times value of the hybrid vehicle to correspond to the setting temperature exceeding accumulation number of times or the setting temperature exceeding accumulation time; and a learning period setting unit that sets the DC learning period value that is reduced by the setting temperature exceeding accumulation number of times or the setting temperature exceeding accumulation time as the new learning period of the engine clutch.

14. The system of claim 13, further comprising a learning period selection unit that selects the new learning period that is set in the each learning period setting unit to set the selected new learning period to a final new learning period.

* * * * *